(12) United States Patent
Guadiana et al.

(10) Patent No.: US 12,221,046 B2
(45) Date of Patent: Feb. 11, 2025

(54) SINGLE-CELL PARTITION FOR VEHICLE

(71) Applicant: Troy Sheet Metal Works, Inc., Montebello, CA (US)

(72) Inventors: Rigoberto Guadiana, Montebello, CA (US); Louis Steven Biegler, Corona, CA (US); Paul Francis McNicoll, Alhambra, CA (US); Mark Bornais, Montebello, CA (US)

(73) Assignee: Troy Sheet Metal Works, Inc., Montebello, CA (US)

( * ) Notice: Subject to any disclaimer, the term of this patent is extended or adjusted under 35 U.S.C. 154(b) by 0 days.

(21) Appl. No.: 18/228,346

(22) Filed: Jul. 31, 2023

(65) Prior Publication Data
US 2023/0373426 A1    Nov. 23, 2023

Related U.S. Application Data

(63) Continuation-in-part of application No. 17/192,868, filed on Mar. 4, 2021, now Pat. No. 11,772,589.

(51) Int. Cl.
*B60R 21/02*    (2006.01)
(52) U.S. Cl.
CPC .................. *B60R 21/026* (2013.01)
(58) Field of Classification Search
CPC .............................. B60R 21/12; B60R 21/026
USPC .......................................... 296/24.42; 52/106
See application file for complete search history.

(56) References Cited

U.S. PATENT DOCUMENTS

| | | |
|---|---|---|
| 3,169,781 A | 2/1965 | Abruzzino |
| 3,190,687 A | 6/1965 | Johnson |
| 4,546,728 A | 10/1985 | May |
| 4,592,523 A | 6/1986 | Herndon |

(Continued)

FOREIGN PATENT DOCUMENTS

| | | |
|---|---|---|
| CN | 111791826 A | 10/2020 |
| DE | 2045871 A1 | 3/1972 |
| NL | 7604715 A | 11/1977 |

OTHER PUBLICATIONS

Partitions-Window Armor & Door Panels Bio Seats & Floor Pans—Complete Transport Systems, Jotto Desk Prisoner Transport, https://jottopublicsafety.gojotto.com/prisoner-transport.html, 55 Pages.

(Continued)

*Primary Examiner* — Paul N Dickson
*Assistant Examiner* — Matthew D Lee
(74) *Attorney, Agent, or Firm* — Lowe Graham Jones PLLC

(57) ABSTRACT

The single-cell partition forms a barrier between front and rear passenger areas of a vehicle and provides access to a portion of the rear passenger area by occupants of the front passenger area who are not in custody. In addition, the single-cell partition protects and secures custodial occupants contained therein from non-custodial occupants present in the additional available space in the rear passenger area while maintaining a method to rapidly remove a side window assembly to provide access to the custodial passenger. The single-cell partition also incorporates additional features such as a roof bracing plate to increase the rigidity of the structure between the front and rear wall, a roof plate cutout to provide light to the custodial passenger and a head support for the custodial passenger.

20 Claims, 8 Drawing Sheets

(56) References Cited

U.S. PATENT DOCUMENTS

| | | |
|---|---|---|
| 4,919,467 A | 4/1990 | Guimelli |
| 4,924,814 A | 5/1990 | Beaudet |
| 4,947,883 A | 8/1990 | Mayo |
| 4,964,666 A | 10/1990 | Dillon |
| 5,054,837 A | 10/1991 | Chapman |
| 5,058,941 A | 10/1991 | Soloman et al. |
| 5,080,416 A | 1/1992 | Dirck |
| 5,511,842 A | 4/1996 | Dillon |
| 5,536,057 A | 7/1996 | Stewart |
| 5,848,817 A | 12/1998 | Niehaus |
| 6,669,259 B2 | 12/2003 | Murray et al. |
| 6,827,382 B2 | 12/2004 | Murray et al. |
| D932,405 S | 10/2021 | Setina et al. |
| 11,135,989 B2 | 10/2021 | Reynolds et al. |
| 2005/0062304 A1* | 3/2005 | Murray .............. B60R 7/14 296/24.42 |
| 2007/0135034 A1* | 6/2007 | Lack .............. B60J 1/20 454/196 |
| 2020/0031303 A1* | 1/2020 | Reynolds .............. B60R 21/12 |
| 2021/0206321 A1* | 7/2021 | Setina .............. B60R 7/02 |

OTHER PUBLICATIONS

Cages—Custom Cages Inc., https://customcageinc.com/cages/, 8 Pages.
Single Cell Detainee Safety Seats, Go Rhino Public Safety, https://publicsafety.gorhino.com/c-1389527-single-cell-safety-seats.html, 2 Pages.
Pro-Cells Archives—Pro-Gard, https://www.pro-gard.com/product-category/products/prisoner-transport/pro-cells/, 3 Pages.
Single Prisoner Partitions, Setina Manufacturing, https://setina.com/partitions/single-prisoner-partition/, 4 Pages.
Transportation "Max" for Trucks, Setina Manufacturing, https://setina.com/trans-max-for-trucks/, 5 Pages.
First in Law Enforcementeqipment, Setina Anniversary Edition Brochure, Setina Manufacturing Company, 40 Pages.
Westin Public Safety Division, Ford Police Interceptor Utility 2022 Catalogs, 4 Pages.

* cited by examiner

SINGLE-CELL PARTITION FOR VEHICLE

PRIORITY CLAIM

The present application is a continuation-in-part application of U.S. Non-Provisional application Ser. No. 17/192,868, entitled SINGLE-CELL PARTITION FOR LAW ENFORCEMENT VEHICLE, filed Mar. 4, 2021, in which the contents are hereby incorporated by reference.

FIELD OF THE INVENTION

The present invention generally relates to a single-cell partition system and method. More specifically, the invention relates to a system and method providing a single-cell partition for a vehicle usable for law enforcement applications, for example.

BACKGROUND OF THE INVENTION

Vehicle partitions are commonly employed to separate the front and rear seat compartments of vehicles such as police cars, taxi cabs, etc., to prevent access to the front seat by someone located in the rear seat. Typically, these partitions include a dividing wall located behind the front seats of the vehicle that forms a barrier between the front seat occupants and the rear seat occupants.

Examples of conventional single barrier partitions include U.S. Pat. No. 3,169,781, issued on Feb. 16, 1965 to Samuel A Abruzzino, U.S. Pat. No. 3,190,687, issued on Jun. 22, 1965 to Wallace M. L. Johnson, U.S. Pat. No. 4,919,467, issued on Apr. 24, 1990 to Mark A Guimelli, U.S. Pat. No. 4,964,666, issued on Oct. 23, 1990 to John A Dillon, U.S. Pat. No. 5,058,941, issued on Oct. 22, 1991 to Tony J. Soloman et al., U.S. Pat. No. 5,511,842, issued on Apr. 30, 1996 to John A Dillon, U.S. Pat. No. 5,536,057, issued on Jul. 16, 1996 to John M. Stewart, German Patent document number 2,045,871, published on March 1972, and Netherlands Patent document number 7,604,715, published on November 1977.

Other vehicle partition configurations include an animal transportation container, as described in U.S. Pat. No. 4,546,728, issued on Oct. 15, 1985 to Gary A May, an ejection seat restraint system for limbs and hands, as described in U.S. Pat. No. 4,592,523, issued on Jun. 3, 1986 to Gerald F. Herndon, a pet restrainer, as described in U.S. Pat. No. 4,924,814, issued on May 15, 1990 to Alain B. Beaudet, a sun shade arrangement for a vehicle, as described in U.S. Pat. No. 4,947,883, issued on Aug. 14, 1990 to Kay L. Mayo, a vehicle divider for dividing a common seat between passengers, as described in U.S. Pat. No. 5,054,837, issued on Oct. 8, 1991 to Dorothy L. Chapman, and a prisoner transport module, as described in U.S. Pat. No. 5,080,416, issued on Jan. 14, 1992 to Ronald L. Dirck, a prisoner transport seat, as described in U.S. Pat. No. 9,452,693, issued on Sep. 27, 2016 to Guy M. Gardner, a prisoner transport seat optimized to a multi-surface formation, as described in U.S. Pat. No. 9,4545,859, issued on Jan. 9, 2017 to Guy M. Gardner, a thermoformed police vehicle partition, as described in U.S. Pat. No. 10,640,069, issued on May 5, 2020 to Guy M. Gardner, a vehicle partition for single passenger secured storage, as described in U.S. Pat. Pub. 2021/020631, published Jul. 8, 2021 for Terry L. Setina.

None of the above inventions and patents, taken either singly or in combination, is seen to describe the instant invention as claimed.

SUMMARY OF THE INVENTION

The present invention is a single-cell partition or vehicle security cage for use in combination with a vehicle having front and rear passenger areas with front and rear seats having surfaces therein, a floor, a ceiling, a side internal surface, and a rear internal surface. The single-cell partition forms a barrier between front and rear passenger areas of a vehicle and provides access to a portion of the rear passenger area by occupants of the front passenger area who are not in custody. In addition, the single-cell partition protects and secures custodial occupants contained therein from non-custodial occupants present in the additional available space in the rear passenger area. The single-cell partition is generally configured in a U-shaped arrangement with a front wall assembly intended to be placed directly behind the front seat connected to a rear side panel placed between the non-custodial rear seat portion and the custodial rear seat portion. A rear barrier wall of the single cell is formed by a cargo barrier partition that is positioned behind the rear seat of the vehicle and extends from the right vehicle side to the left vehicle side. A bracing plate above the custodial occupant connects the front wall, the side wall, and the rear wall to add rigidity to the single cell structure.

The front wall assembly and rear side panel may be constructed of any of a variety of heavy-duty material, including heavy-duty gage steal steel or heavy-duty alloys, for example, with a removable heavy-duty first rear window panel that provides visibility to non-custodial portion of the vehicle. A second rear heavy-duty window panel is configured to provide see-through visibility to officers or persons outside the vehicle of persons in custody and within the partition. The first and second heavy-duty window panels may be constructed of unbreakable glass, polycarbonate such as Lexan®, etc., or a combination of such materials The side panel wall of the single cell is configured with a removable side window portion that allows access to the custodial occupant by non-custodial persons in the event of medical emergency or vehicular accident wherein the vehicle door adjacent to the custodial occupant is inoperable.

The rear barrier wall may be configured to include a head rest for the custodial occupant.

The single-cell partition provides a secure area for an occupant in a portion of the rear passenger area, preferably approximately one-third to one-half of the rear passenger area. This enables the occupant or occupants of the front seats to operate and generally perform their duties without concern about interference from the occupant or occupants of the rear seat. Furthermore, the vehicle security cage provides additional space for non-custodial occupants for storage and access to equipment that should not be accessible to the passenger in custody within the single-cell partition. Alternatively, the additional space in the rear passenger area may be used to accommodate a security animal such as a K-9 unit (dog) or another custodial occupant to be separated from the first.

The front panel is configured to extend from the ceiling of the vehicle to the floor of the vehicle, with a kick space defined at the bottom of the front panel that provides ample leg room for a custodial occupant. The front panel and side panel each includes bolting, bracketing, or welding means for bolting, welding, or otherwise fastening single-cell partition to the internal surface of the vehicle.

Accordingly, it is a principal object of the invention to provide a single-cell partition that effectively isolates occupants seated in the single-cell partition from occupants seated in the front passenger area while providing a separate area for non-custodial passengers in the rear seat or access to the separate non-custodial portion by occupants of the front passenger area.

It is a further object of the invention to provide improved elements and arrangements thereof in a vehicle security cage for the purposes described that is inexpensive, dependable, and fully effective in accomplishing its intended purposes.

These and other objects of the present invention will become readily apparent upon further review of the following specification and drawings.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Various inventive features are described below that can each be used independently of one another or in combination with other features.

Figure 1:
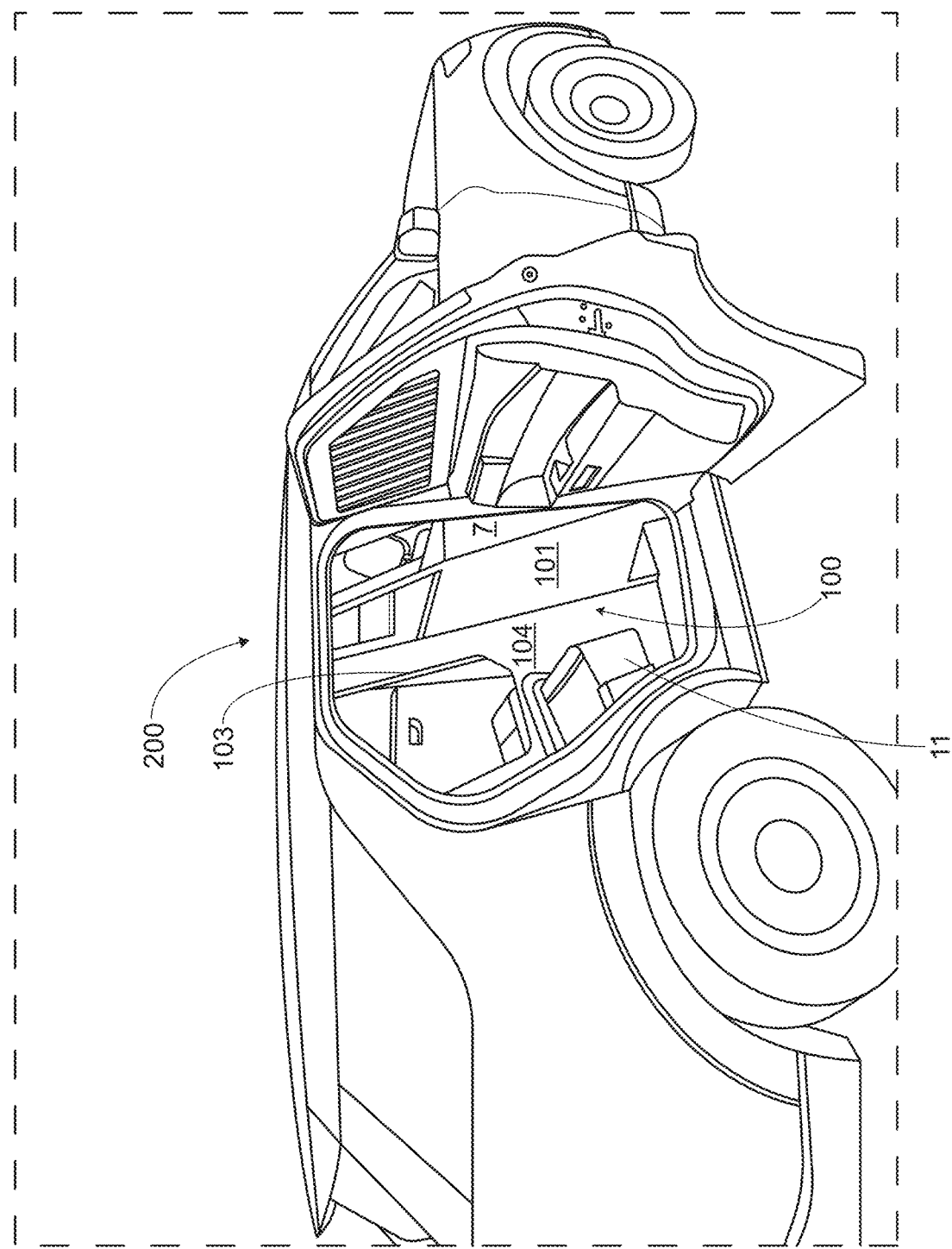
FIG. 1 is a diagrammatic right isometric view of a vehicle with a single-cell partition installed according to one embodiment.

Broadly, embodiments of the present invention generally provide a single-cell partition system and method. With reference to FIG. 1, a right isometric view of a vehicle 200 with a single-cell partition 100 installed according to one embodiment. A single passenger seat 11 is accessible through the vehicle's 200 rear passenger door but separated from the second rear passenger seat by the single-cell partition 100, the front passenger seat by the front panel 101, and with a lower wing 7 fit into the door panel region of the vehicle. A heavy-duty window assembly 103 may be removed from the side panel 104, to provide additional access to the custodial passenger within the single cell partition 100 in the event of an emergency such as a car accident obstructing the vehicle's 200 rear passenger door, or in the event the custodial passenger within the single cell partition 100 requires medical attention during transit.

Figure 2:
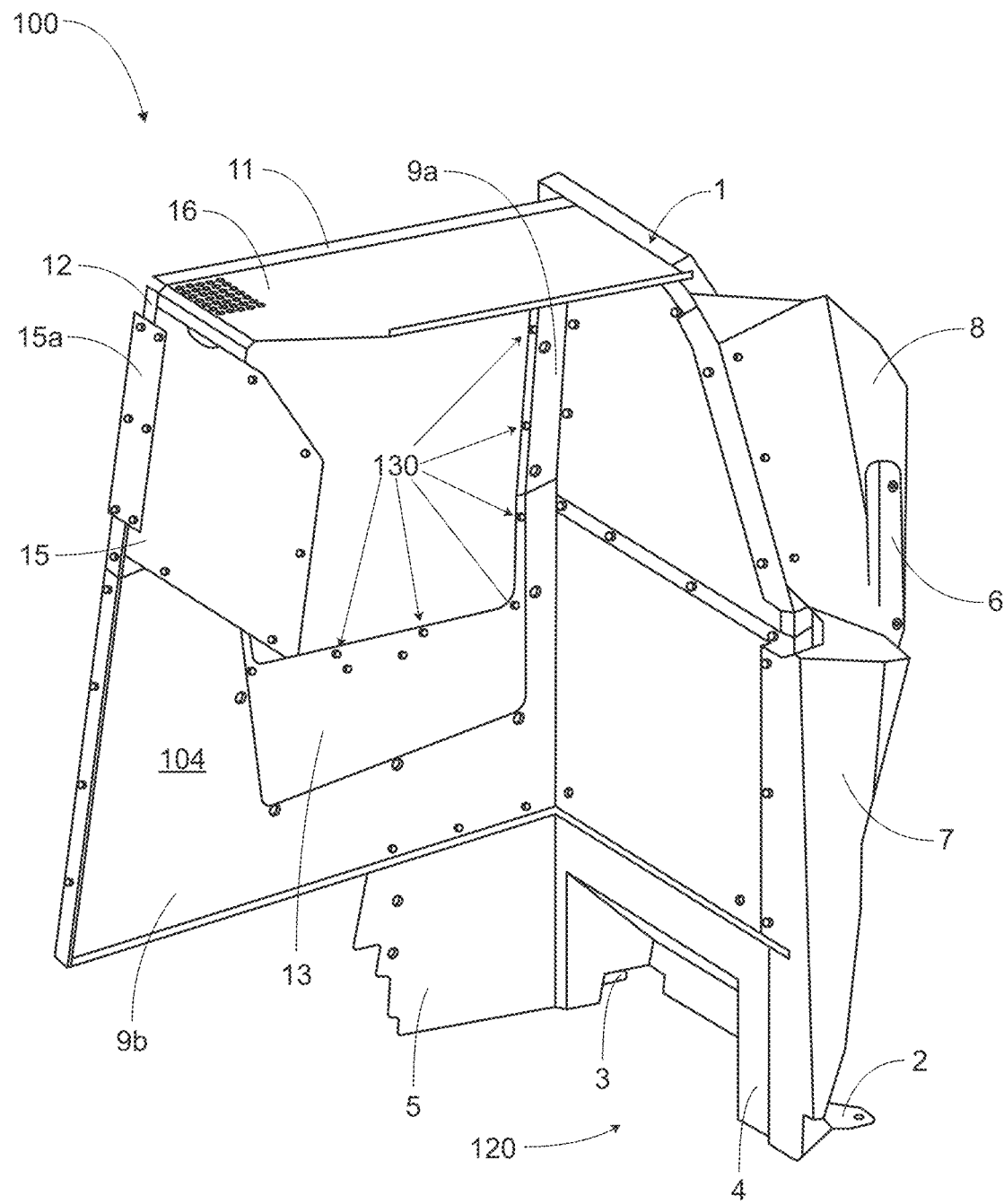
FIG. 2 is a diagrammatic rear right isometric view of a single-cell partition according to one embodiment.

With reference to FIG. 2, a diagrammatic rear right isometric view of a single-cell partition is shown according to one embodiment. A single-cell partition 100 or vehicle security cage is for use in combination with a vehicle having front and rear passenger areas with front and rear seats having surfaces therein, a floor, a ceiling, a side internal surface, and a rear internal surface.

The single-cell partition 100 forms a barrier between front and rear passenger areas of a vehicle and provides access to a portion of the rear passenger area by occupants of the front passenger area who are not in custody. In addition, the single-cell partition 100 protects and secures custodial occupants contained therein from non-custodial or other custodial occupants present in the additional available space in the rear passenger area.

The partition 100 is connectable as a modular unit to the interior of the vehicle, including using a number of brackets, such as an inner foot bracket 2, an outer foot bracket 3, a B pillar bracket 6, and a bracing plate on top 16.

The single-cell partition 100 is generally configured in a U-shaped arrangement with a front wall assembly 1 intended to be placed directly behind the front seat, said front wall assembly 1 being connected to a side panel 104 placed between the non-custodial rear seat portion and the custodial rear seat portion. The side panel 104 may comprise a rear side panel portion 12, a front side panel portion 101, and a lower side panel portion 9b. The front wall assembly 1 and side panel 104 may be constructed of any of a variety of heavy-duty material, including heavy-duty gage steel, heavy-duty alloys, Kevlar, carbon fiber, or plastic, for example. A removable heavy-duty first rear window panel 13 provides visibility to the non-custodial portion of the vehicle. The first window panel 13 may be secured between the front side panel portion 10, the rear side panel portion 12, and lower side panel portion 9b by means of removable bolts that are removable from the outside of the partition 100 from the non-custodial portion of the rear seat.

An upper wing 8 and a lower wing 7 provide for shaped fit into the door panel region of the vehicle.

In one embodiment, removability of the first window panel 13 may be provided by means of rapidly removable bolts 130 that allow for rapid removal of the first window panel 13, in case of emergency or accident requiring fast extraction of a person in custody from within the partition 100, when fast and safe removal is not possible through normal exit through the vehicle door. For example, in the event of a vehicle accident wherein the rear door is jammed on the partition side, it may be necessary to rapidly remove the first window panel 13 in order to extract the person in custody. Examples of rapidly removable bolts 130 that can be used include, by way of example and not by way of limitation, spring-loaded bolts readily available from Galvanised Specialists Ltd of Wes Midlands, United Kingdom, retaining pin bolts readily available from the same company, other types of rapid pull-pin bolts that allow for fast and easy disengagement of removable bolts 130 if a person needs rapid extraction from the partition 100.

A second rear heavy-duty window panel 15 connected to the side panel 104, via a backing plate 15a, is configured to provide see-through visibility to officers or persons outside the vehicle of persons in custody and within the partition assembly 100. The first and second heavy-duty window panels 13 and 15 may be constructed of unbreakable glass, polycarbonate such as Lexan®, etc., or a combination of such materials The front wall assembly 1 is configured to extend from the ceiling of the vehicle to the floor of the vehicle, with a kick space 120 defined at the bottom of the front wall assembly 1 formed by a shaped indentation of a kick panel 4, that provides ample leg room for a custodial occupant, adjacent to a side kick panel 5 down to the floor on the side. The front wall assembly 1 and side panel each includes bolting, bracketing, or welding means for bolting, welding, or otherwise fastening single-cell partition 100 to the internal surface of the vehicle.

Figure 3:
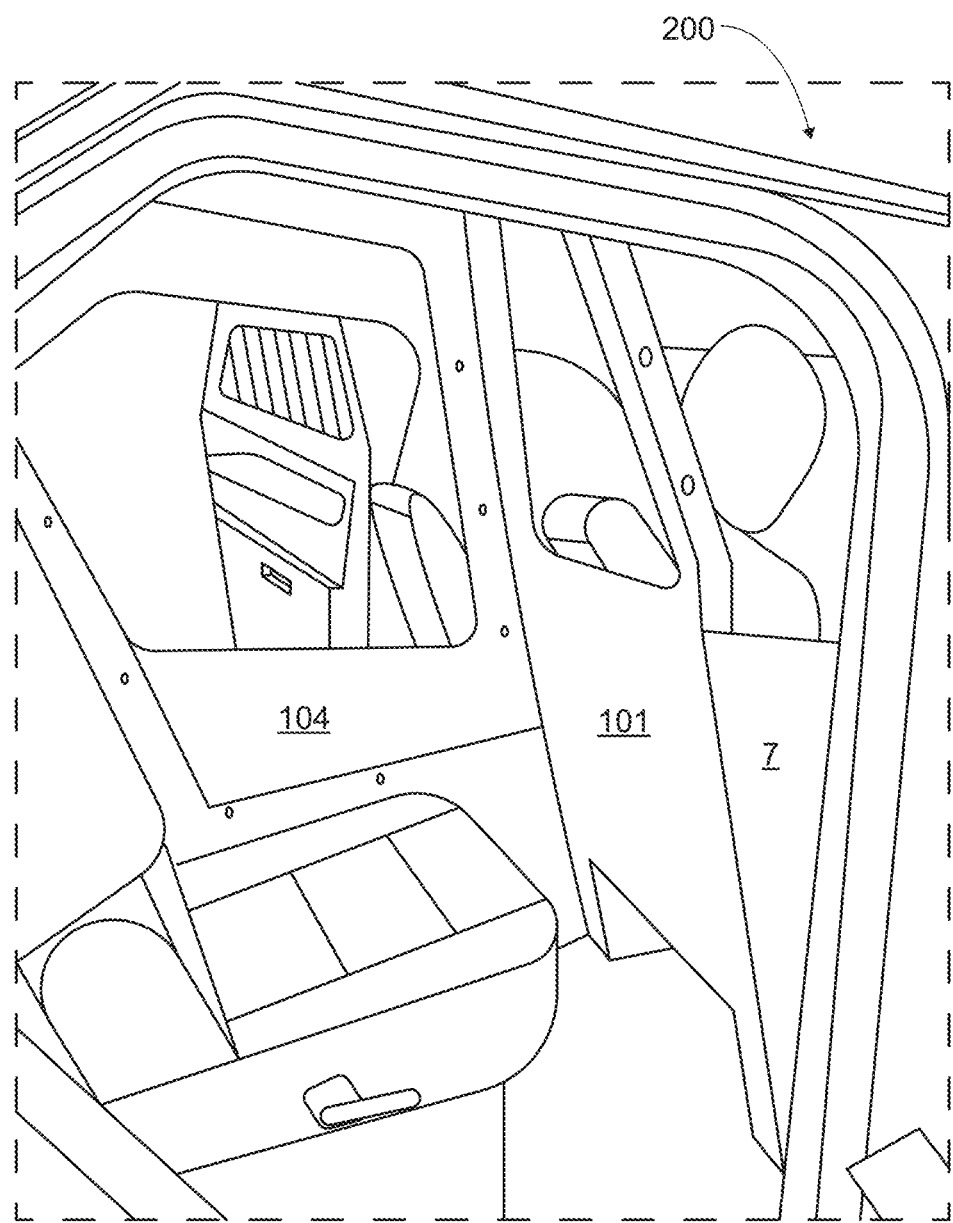
FIG. 3 is a right isometric view of a partition installed in a vehicle according to the embodiment of FIG. 2.

FIG. 3 is a view of a partition 100 installed in a vehicle 200. In FIG. 2, the installed side panel 104 and the lower wing 7 is shown fitted into the vehicle 200.

Figure 4:
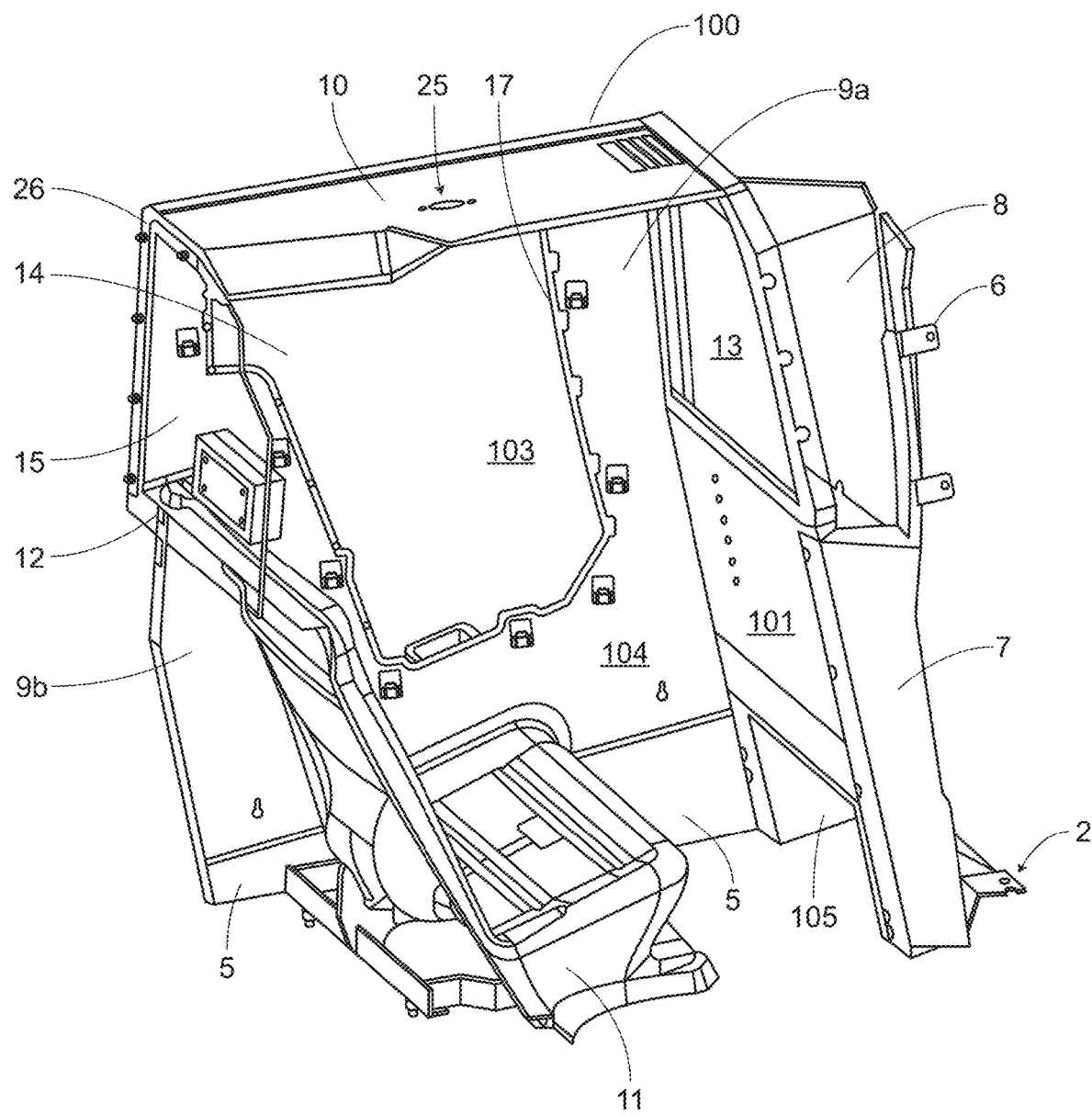
FIG. 4 is a diagrammatic rear right isometric view of a single-cell partition according to one embodiment wherein the rear barrier wall is not shown.

FIG. 4 shows a diagrammatic rear right isometric view of a single-cell partition according to one embodiment. A single-cell partition 100 or vehicle security cage is for use in combination with a vehicle having front and rear passenger areas with front and rear seats having surfaces therein, a floor, a ceiling, a side internal surface, and a rear internal surface.

FIG. 4 expands on FIG. 2 incorporating a number of additional features that may be incorporated into an embodiment including a bracing plate 10 that adds rigidity to the single-cell partition as well as lamp cutout 25 in one embodiment centered in the bracing plate 10 in other embodiments positioned elsewhere on the bracing plate 10, as well as a vent in one embodiment positioned forward on the bracing plate 10 but in other embodiments positioned elsewhere on the bracing plate 10. The figure also incorporates a headrest pad 12 that may be attached to a polycarbonate sheet, metal screen, or other backing material as well as a single passenger seat 11, a removable side window assembly 103, and attachment tab 6 that attach to the vehicle at the seatbelt retractor anchoring points.

The side panel 104 may comprise an upper side panel portion 9a and a lower side panel portion 5. The front panel 101 and side panel 104 may be constructed of any of a variety of heavy-duty material, including heavy-duty gage steel, heavy-duty alloys, Kevlar, carbon fiber, or plastic, for example. A removable heavy-duty side window panel assembly 103 provides visibility to the non-custodial portion of the vehicle.

A rear heavy-duty window panel 15 connected to the side panel 104, via a backing plate 26, is configured to provide contraband control behind the head of the custodial occupant.

In another embodiment the lamp cutout 25 could be replaced with one or more light sources integrated within the cell partition.

Figure 5:
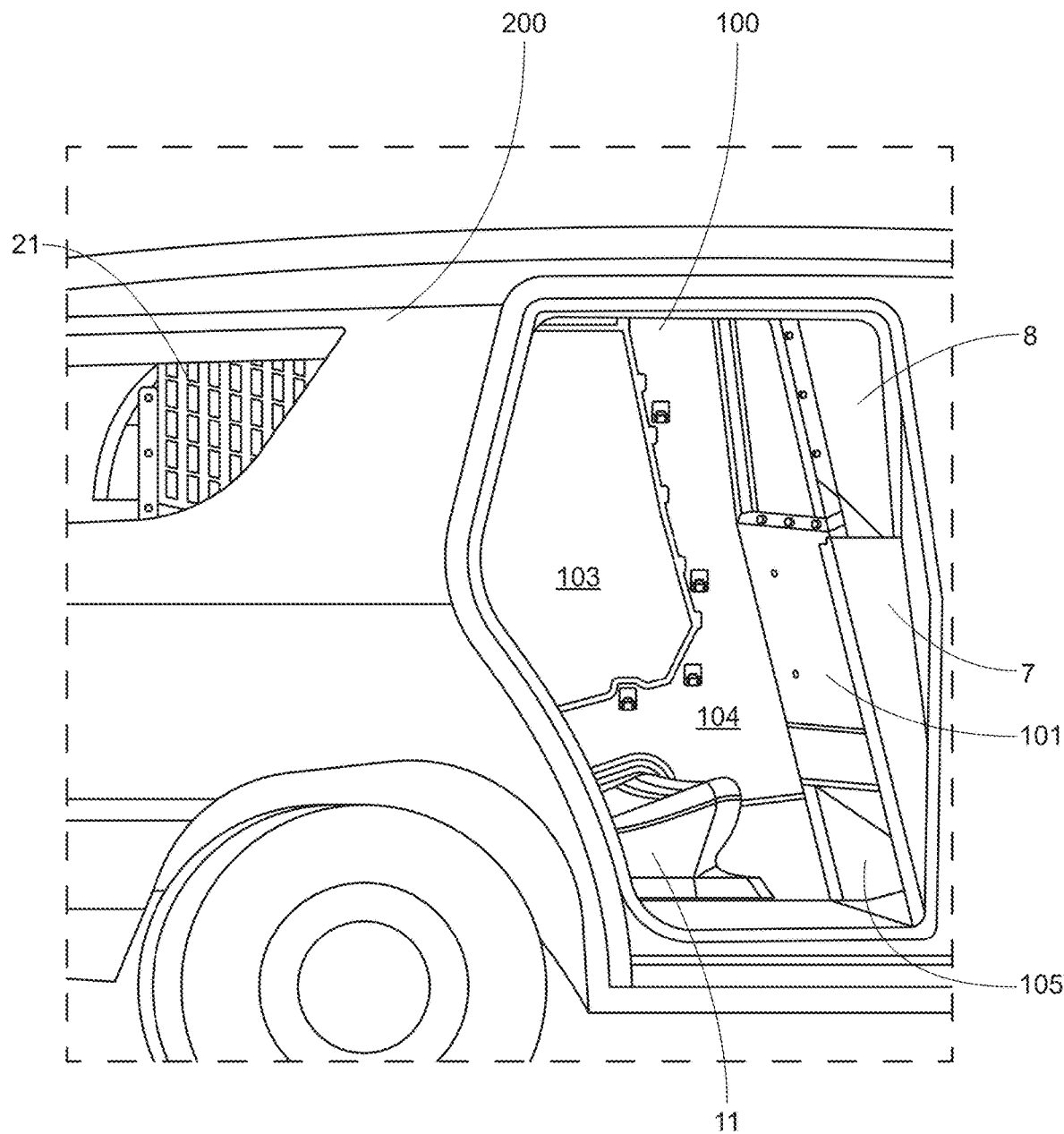
FIG. 5 is a view of a partition installed in a vehicle according to the embodiment of FIG. 4 where the installed side panel wall, the front panel, the lower wing, and the upper wing, are shown fitted into the vehicle.

FIG. 5 is a partially installed embodiment of FIG. 4 with the upper rear wall barrier 21 shown having a pattern of polygonal openings for visibility. Also installed are an upper wing 8 and a lower wing 7, which provide for shaped fit into the second or B pillar region of the vehicle 200 as well as the front wall 101. Upper wing 8 and lower wing 7 are configured to extend from the ceiling of the vehicle to the floor of the vehicle, with a kick space 105 defined at the bottom of the front panel and including a side panel 104 with the removable rear side window 103.

Figure 6:
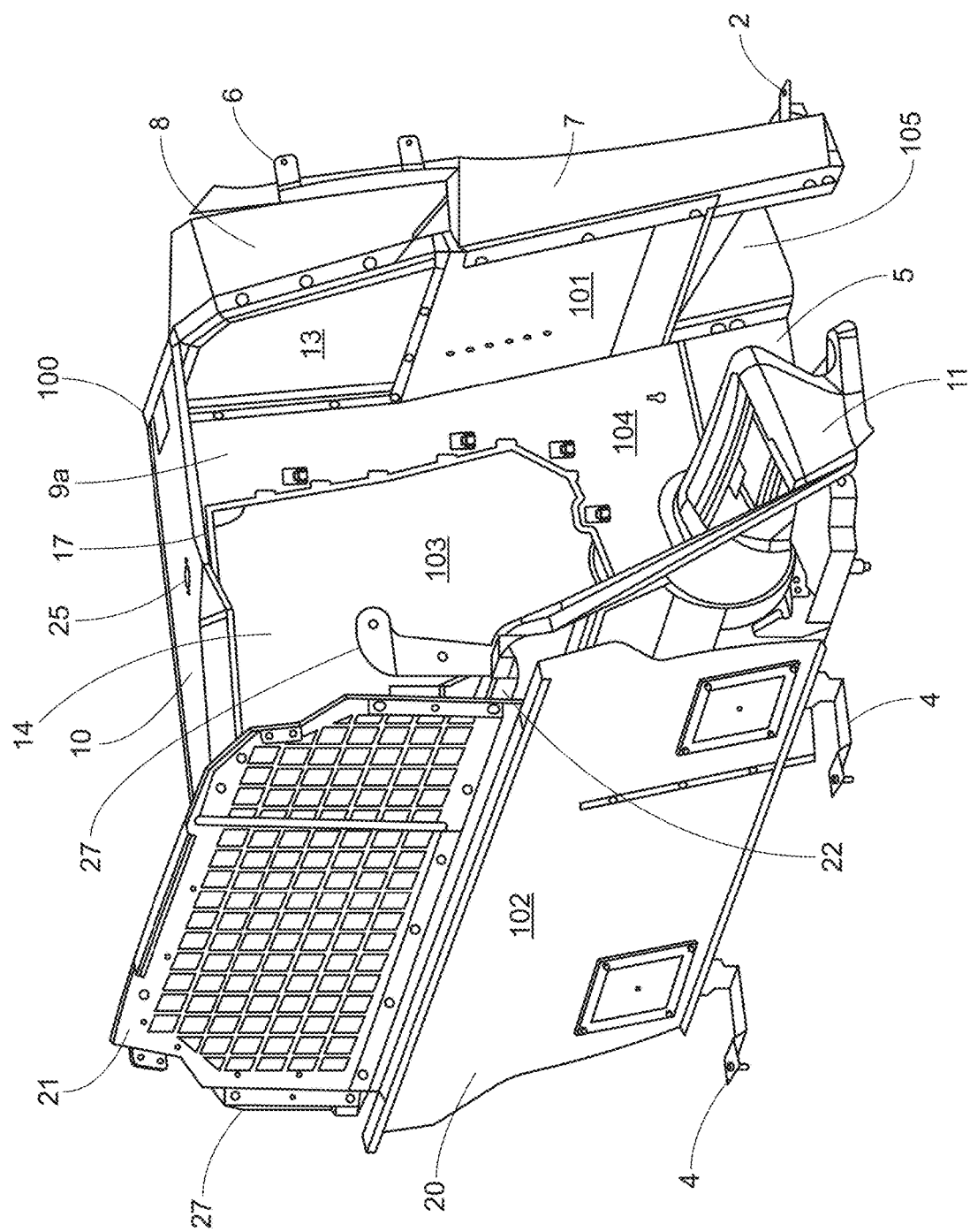
FIG. 6 is a diagrammatic right rear isometric view of a single cell with the rear barrier wall included.

FIG. 6 is a rear view further showing a rear barrier wall assembly 102 configured between the C pillars of the vehicle extending left to right behind the seats of the non-custodial and custodial occupants. A cross bar 22 with C pillar brackets 27 is the structural foundation of the rear barrier wall 102 connecting the barrier wall left to right between the C pillars of the vehicle. The upper rear wall barrier 21, which has a pattern of polygonal openings for visibility, and lower rear wall 20 are connected to the cross bar 22 to complete the rear barrier wall 102.

In one embodiment, a bracing plate 10 is configured along the upper edges of the U-shaped single cell 100 connecting the front wall 101, the side wall 104, and rear barrier wall 102. The bracing plate 10 adds rigidity to the single cell 101 walls structure. The bracing plate may contain cutouts 25 for insertion of a light above the head of the custodial occupant.

Figure 7:
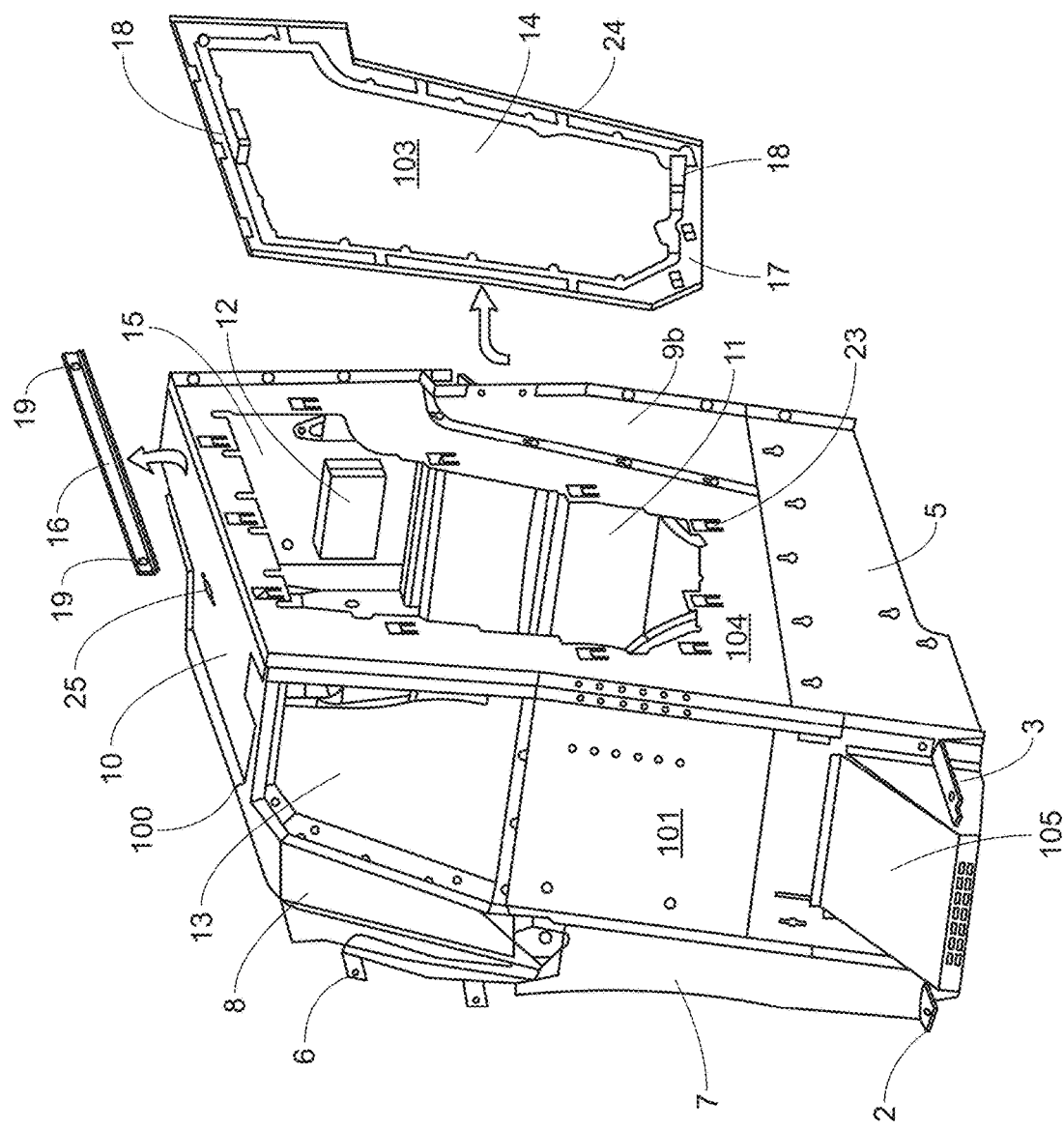
FIG. 7 is a diagrammatic front left isometric view of the single cell illustrating the removal of the locking bar and the removable rear side window where the rear wall is not shown in this view.

FIG. 7 is a front left isometric showing a removable locking bar 16, attached at multiple points 19. The bar attaches in one embodiment on the bracing plate 10 and in another on the side panel 101 to secure the removable window assembly 103. This isometric view also shows one embodiment of the removable window assembly 103 with one or more handles 18 to assist in removing the window by lifting it out of lance 23 and bridge 24 attachment points. Said removal could be achieved by lifting upward or opposite of whatever direction the lance 23 and bridge 24 attachment points are oriented. In the embodiment shown here, the bridge 24 structures are affixed to the removable window 14 and the lance 23 structures are cut into the side panel portion 9.

A removable side window assembly 103 is configured within the side panel assembly 104. The removable side window assembly consists of a side window 14 encompassed within a side window frame 17. Lifting handles 18 are attached to the side window assembly on the non-custodial side to facilitate removal of the side window assembly 103.

The transparent heavy-duty windows 13, 14, and 15 provide see-through visibility to officers or persons outside the vehicle of persons in custody and within the partition assembly 100. The heretofore mentioned heavy-duty window panels 13, 14, and 15 may be constructed of transparent unbreakable glass, polycarbonate, metal grid, etc., or a combination of such materials.

In other embodiments the window assembly 103 may be attached to the side panel 101 by a variety of means including keyhole screws, sliding posts, quick removal screw, latches, as well as other quick-release methods known in the art to securely attaching the window assembly 103 to the side panel 101 while maintaining a rapid method to remove it.

In this embodiment of the removable rear side window, a locking bar 16 is first removed from the non-custodial side, by way of example and not by way of limitation, by quarter turn screws; and the removable side window is lifted and removed towards the non-custodial occupant allowing access to the custodial occupant.

Figure 8:
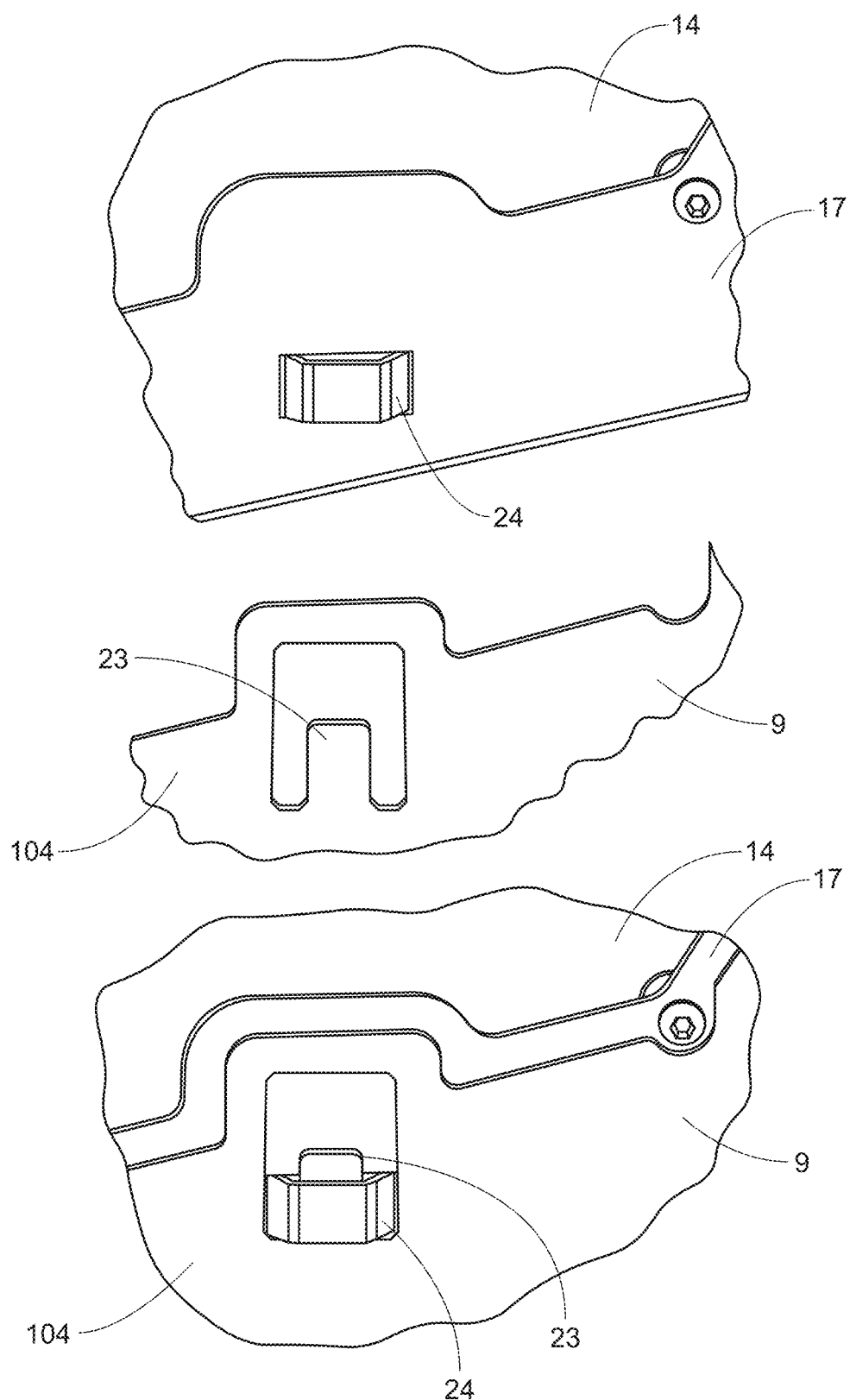
FIG. 8 is a diagrammatic example of a quick-removal construction used in one embodiment to accomplish the quick removal of the side window assembly.

FIG. 8 shows a magnified view of one embodiment wherein a lance 23 and bridge 24 sheet metal technique allows the removability of the side window assembly 103 from the side panel assembly 104 providing a means of rapid access to, or extraction of a custodial occupant from within the partition 100 if necessitated by a vehicle accident, to provide medical care or for another emergency.

It should be understood, of course, that the foregoing relates to exemplary embodiments of the invention and that modifications may be made without departing from the spirit and scope of the invention as set forth in the following claims.

We claim:
1. A cell partition for a vehicle, comprising:
a front wall assembly positioned behind a front seat of a vehicle;
a side wall assembly securely attached to the front wall assembly, extending from a corner of the front wall assembly to a rear wall assembly behind a rear seat, said side wall assembly located between a second rear seat portion and a custodial rear seat portion of the vehicle;
a removable side window assembly positioned within the side wall assembly; and at least one releasable fastener that can be rapidly released only from the second rear seat portion, facilitating the swift removal of the side window assembly.

2. The cell partition of claim 1, wherein the removable side window assembly is detachably removable by means of lance and bridge attachment points.

3. The cell partition of claim 2, further comprising a locking bar positioned opposite the orientation of the lance and bridge attachment points, removable from the rear non-custodial seat positions.

4. The cell partition of claim 1, wherein the at least one releasable fastener comprises one or more of keyhole screws, sliding posts, quick removal screws, or latches, enabling efficient and rapid removal of the side window assembly from the non-custodial rear seat portion.

5. The cell partition of claim 1, further comprising one or more handles attached to the window assembly, positioned to assist a non-custodial occupant in removing the panel.

6. The cell partition of claim 1, wherein the cell partition is affixed to the vehicle at seatbelt retractor anchoring points.

7. The cell partition of claim 1, further comprising a structural cross bar connecting the front wall assembly, rear wall assembly, and side panel.

8. The cell partition of claim 1, further comprising a headrest pad in the custodial area.

9. A cell partition for a vehicle, comprising:
a front wall assembly positioned behind a front seat of a vehicle;
a rear wall assembly behind a custodial rear seat portion of the vehicle;
a side wall assembly connected to the front wall assembly, extending from a corner of the front wall assembly to the rear wall assembly, the side wall assembly placed between a first rear seat portion and the custodial rear seat portion of the vehicle, the side panel having a lower portion;
a first clear window panel positioned above the lower portion;
a bracing plate assembly rigidly and directly connected between all three of the front wall assembly, the rear wall assembly, and the side wall assembly.

10. The cell partition of claim 9, further comprising one or more cutouts in the bracing plate assembly, positioned to provide light to a custodial passenger in the custodial rear seat portion.

11. The cell partition of claim 9, further comprising one or more light sources integrated within the cell partition.

12. The cell partition of claim 9, wherein the side panel further comprises a removable window assembly positioned above the lower portion; and a plurality of detachable fasteners that can be rapidly removed only from the non-custodial rear seat portion, facilitating the swift removal of the side window assembly.

13. The cell partition of claim 9, wherein the cell partition is affixed to the vehicle at seatbelt retractor anchoring points.

14. The cell partition of claim 9, further comprising a vent integrated into the bracing plate assembly.

15. A cell partition for a vehicle, comprising:
a front wall assembly positioned behind a front seat of a vehicle;
a side panel securely attached to the front wall assembly, extending from a corner of the front wall assembly to a rear wall assembly behind a rear seat, said side panel located between a non-custodial rear seat portion and a custodial rear seat portion of the vehicle, wherein the side panel includes a lower portion;
a first clear window panel positioned above the lower portion;
a light source integrated within the cell partition to illuminate a custodial area.

16. The cell partition of claim 15, wherein the front wall assembly and the rear seat assembly; side wall assembly are connected by a bracing plate assembly serving as a rigid connection between.

17. The cell partition of claim 15, wherein the first clear window panel is detachably removable by means of lance and bridge attachment points, allowing for easy attachment and removal of the window panel from the side panel assembly.

18. The cell partition of claim 15, further comprising a locking bar positioned opposite the orientation of the lance and bridge attachment points, removable from the rear non-custodial seat positions.

19. The cell partition of claim 15, further comprising one or more handles attached to the window assembly, strategically positioned to assist the non-custodial occupant in removing the panel, facilitating easy handling and manipulation during the removal process.

20. The cell partition of claim 15, further comprising a headrest pad in the custodial area.

* * * * *